United States Patent

Hunt et al.

[11] 3,801,188

[45] Apr. 2, 1974

[54] METHOD AND MEANS FOR TESTING THE COLOUR DISCRIMINATION IN VISION

[75] Inventors: Robert William Gainer Hunt, North Harrow; Stephen John Dain, Dorset, both of England

[73] Assignee: Tintometer Limited, Salisbury, Wiltshire, England

[22] Filed: July 11, 1972

[21] Appl. No.: 270,638

[30] Foreign Application Priority Data

Jan. 7, 1972 Great Britain .......................... 750/72

[52] U.S. Cl. ...................... 351/30, 351/35, 351/36, 351/37, 351/39
[51] Int. Cl. .............................................. A61b 3/06
[58] Field of Search .............. 351/1, 17, 30, 35, 36, 351/37, 39

[56] References Cited
UNITED STATES PATENTS
2,528,513   11/1950   Grether ........................... 351/35 X FOREIGN PATENTS OR APPLICATIONS
1,043,216   11/1953   France ............................... 351/17

OTHER PUBLICATIONS
M. Kirschen, Amer. J. Of Optometry & Archives of Amer. Acad. of Optometry, Vol. 36, No. 3, 3-1959, pps. 137-143.

Primary Examiner—Paul A. Sacher
Attorney, Agent, or Firm—Cushman, Darby & Cushman

[57] ABSTRACT

A method and apparatus for determining the colour discrimination of the vision of a subject in which light of a predetermined reference colour is compared with a plurality of lights of different test colours, one of which is preferably identical with the reference colour, and diluting the coloured lights with a diluting colour, and changing the relative intensity of dilution therebetween and measuring the value of said relative dilution when the subject attempts to match the reference light with one of the test colours.

12 Claims, 2 Drawing Figures

METHOD AND MEANS FOR TESTING THE COLOUR DISCRIMINATION IN VISION

BACKGROUND OF THE INVENTION

This invention relates to a method and means for determining the colour discrimination of vision of a subject.

The most widely used method of testing colour vision is by means of the so-called "book-tests." In these tests, books are used, on each page of which is a number or other symbol depicted in dots or other shapes of one group of colours with a background of similar dots or other shapes of another group of colours. The two groups of colours are chosen so as to make the number or symbol clearly visible to a person with normal colour vision but invisible to a person having defective colour vision. Examples of this type of test include the Ishihara test available from H.K. Lewis & Co. London and the H.R.R. Pseudo-isochromatic plates available from the American Optical Co., Buffalo, N.Y., U.S.A.

The book tests are very useful for screening large numbers of people to see whether any deficiency is present, but they are not very useful in determining the nature and extent of any deficiency.

Other types of test which exist, such as Anomaloscopes, Hue Discrimination Tests, and Lantern tests, all have various disadvantages. Thus Anomaloscopes are expensive, are not easy to use and give results which are not easily interpreted. Hue Discrimination tests, such as the Farnsworth 100-Hue test, may involve discontinuities in the hue circle if the test divides the hue circle into several segments, may not prevent hue differences being detected as lightness differences, and give results which are often difficult to interpret; Lantern tests are usually very specific to signal-light situations, presenting to the subject only small points of light in a dark background and covering only those colours used in signals.

SUMMARY OF THE INVENTION

The object of the invention is to provide a relatively simple method and apparatus for determining both the nature and the extent of deficiencies in human colour vision. Diagnosis of the type of defect by observing confusions of hue, coupled with the relative luminances at which those confusions occur, provides a simple and soundly based method. Determination of the extent of the defect by observing the effect on the confusions by diluting the colours with white light provides a simple quantitative measure of the degree of deficiency. A test method which measures the extent of any deficiency is very advantageous in assessing the potential difficulty which a subject may have in practical tasks involving colour discrimination, some of the book tests detect deficiencies which are so slight as to be of little practical significance for most occupations, without showing that they are different from more severe deficiencies which involve occupational hazards. Dilution of colours with white light enables very small colour differences to be displayed to the subject without the difficulties involved in manufacturing and calibrating physical test samples possessing small colour differences of high accuracy.

The invention consists in a method of determining the colour discrimation of the vision of a subject comprising viewing simultaneously a source of light of reference colour of predetermined colour and a plurality of sources of light of different test colours of a variety of predetermined colours, one of which is preferably identical in colour with the colour of the source of light of the reference colour, diluting the source of light of reference colour and the plurality of sources of light of different test colours with the same monochromatic or polychromatic light, changing the relative intensities of the diluting light therebetween, and indicating and/or measuring the value of said relative dilution, whereby the characteristic of said discrimination can be ascertained by the subject attempting to match the light received from the source of light of reference colour with the light received from one of the plurality of sources of light from the test colours.

The invention further consists in a method as set forth in the preceding paragraph in which the polychromatic light is white light.

The invention still further consists in a method as set forth in either of the preceding paragraphs in which the intensity of the source of light of reference colour is variable relative to the intensity of the sources of light of the test colours.

The invention still further consists in apparatus for determining the colour discrimination of the vision of a subject comprising a housing, an illuminating lamp in the housing, a first diffusing means for producing a uniform field of diffused light from said lamp in a first plane, a support means mounted for movement in a plane parallel to said first plane, windows in the support means each provided with transparent means of different colours for the passage of diffused light from the said first plane, a second diffusing means for producing a uniform field of diffused light from said lamp in a second plane, optical means for carrying the relative intensity of diffused light from the two planes, optical means for viewing the light from the two planes superimposed the one upon the other, and indicating and/or measuring means for indicating and/or measuring the relative intensities of the diffused light from the two planes.

The invention still further consists in apparatus as set forth in the preceding paragraph in which the diffusing means for producing a uniform field of diffused light is a box like channel with open ends with mirrored inner surfaces and a diffusing screen in said plane at the opposite end of the channel to the lamp.

The invention still further consists in apparatus as set forth in the preceding paragraph in which there are two channels which are positioned parallel to one another and the plane of diffused light from one said channel is co-extensive of the plane of diffused light of the other channel.

The invention still further consists in apparatus as set forth above in which the support means is opaque and is disc like in form and has a plurality of windows therein arranged in a regular pattern one of which serves as a source of reference colour while the remainder serve as sources of test colours.

The invention still further consists in apparatus as set forth in which the means for viewing the light from the two planes superimposed the one upon the other are a plane mirror adjacent said first plane and set at an angle thereto, and a plane sheet of transparent material adjacent said second plane and acting as a partical mirror and set at an angle thereto, the image reflected in the mirror being viewed through the sheet of transparent material.

The present invention provides a method and apparatus for testing colour vision in which the type of a subject's defect is determined by the hue or hues of test colours of a wide variety of hues which he finds appear the same as a reference colour, and by the relative luminance required by the reference colour to achieve this equality of appearance; and the extent of the subject's deficiency is determined by the extent to which dilution of the test colours with white light or light of another convenient colour can be removed before the reference colour is only matched by a test colour which is identical to the reference colour.

BRIEF DESCRIPTION OF THE DRAWINGS

The accompanying drawing shows by way of example only, one embodiment of the invention in which FIG. 1 is a diagrammatic representation of an instrument constructed in accordance with the invention, while

DESCRIPTION OF THE PREFERRED EMBODIMENTS

Figure 1:
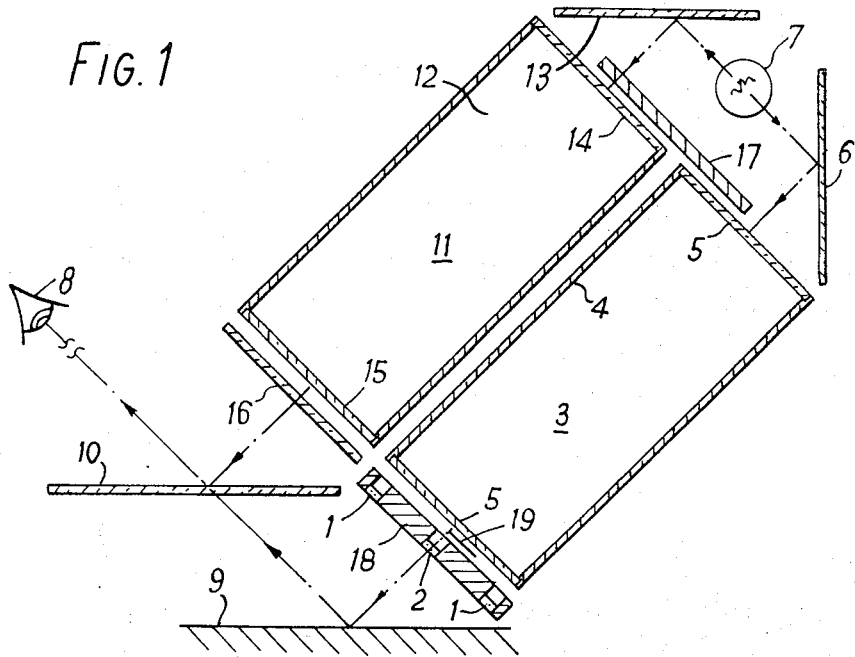
Figure 2:
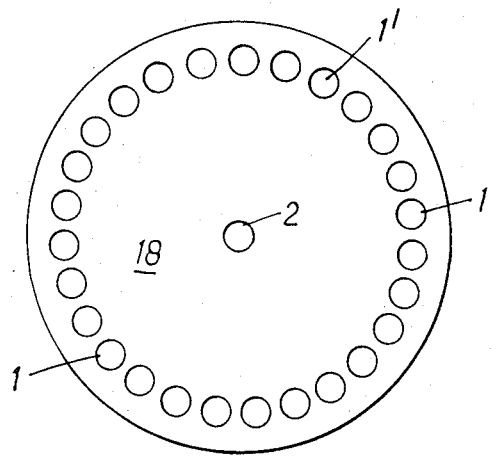
FIG. 2 is a front elevation of a support means with windows for the reference colour and the test colours.

The method of testing colour vision in accordance with the invention, can be conveniently carried out by using an instrument of the type shown in FIGS. 1 and 2. The subject views an array of test colours 1 of different hues arranged in a circle around a central reference colour 2 as shown in FIG. 2. This array of colours 1 and 2 is illuminated by means of a channel for light 3 formed as a box of mirrors 4 with diffusers 5 at each end, (to give uniform illumination over the array), with a mirror 6 and a lamp 7. The subject, whose eye is shown at 8, sees the array of colours 1 and 2 reflected in another mirror 9, viewed through a sheet of plain glass 10, or other suitable plane sheet of material. In this plain glass is reflected light from a second channel for light 11, formed as a box of mirrors 12, which is illuminated by the same lamp 7, and another mirror 13, and having diffuses 14 and 15. This light, which can be made white by means of a filter 16, (usually a blue filter if the lamp 7 is a tungsten filament lamp), is seen by the subject as diluting the colours of the array 1, 2. The amount of dilution is varied by varying the light between the channels 3 and 11 by means of the perforated shutter 17, which can be moved up so as to completely prevent light from entering the channel 11, or down so as to completely prevent light from entering the channel 3, or the shutter 17 can occupy any intermediate position, so as to allow various proportions of light to enter the two channels. Means are provided for indicating and/or measuring the value of the relative proportions of light so controlled.

One of the test colours in the array 1, is made identical with the reference colour 2 in the centre of the array. The subject's task is to recognise correctly which of the test colours is the one which matches the reference colour. The array of test colours are supported in a circular disk 18 and can be rotated about the reference colour to prevent the subject from using position instead of colour to make his judgments. Starting at any convenient intermediate position of the perforated shutter 17, the subject is asked to say which colour or colours in the array match the reference colour. If the correct colour, and only the correct colour, is chosen, the array is then rotated, the perforated shutter 17 is moved down to some new convenient position, and the subject has to repeat the task. By moving the perforated shutter 17 down, the amount of light illuminating the array is decreased, and that illuminating the diluting light is increased, hence the task is made more difficult. By making the subject perform the task at various positions of the perforated shutter 17, a lowest position for it is eventually found where the subject is just unable to identify correctly the test colour which matches the reference colour. The position of the perforated shutter 17 is then a measure of the degree of the colour deficiency, if any.

The method can also be used to test the colour discrimination of normal observers, by noting the position of the perforated shutter 17 at which they can no longer perform the task correctly; it is necessary to know the position of the perforated shutter for normal subjects so that deficient subjects can be distinguished.

It will be found that some subjects will be unable to carry out the task correctly even when the perforated shutter is in the fully up position, so that the array is not diluted with any white light. These subjects are usually dichromats (or even monochromats), whose colour vision is very different from that of normal subjects in that it is a function of only two variables (or one in the case of monochromats).

The type of deficiency of the subject, if any, is determined by noting the colours in the array which appear to him to match the reference colour in addition to (or instead of) the identical colour. It is desirable for the test colours in the array to cover the complete hue circle from red, through orange, yellow, green, blue, purple, mauve and back to red again, but arranged in the array in a random hue order, and for the subjective difference of each colour from the reference colour to be similar for normal observers, and for all the test colours to have a similar luminance to that of the reference colour.

The reference colour is conveniently chosen to be about the same colour, as seen by the subject, as that of the diluting light. A small perforated shutter 19, can partially cover an aperture between the channel 3 and the reference colour, so as to provide a means for varying the luminance of the reference colour relative to that of the other test colours; this luminance control is adjusted during the test by the subject as an aid to his obtaining matches between the test and reference colours. To provide test and reference colours of good permanence they can be produced by means of coloured glass filters, and equalisation of the luminances of the test colours can be achieved by using opaque half-tone screens of sufficient fineness to be unresolved by the subject.

The setting of this perforated shutter 17 for a colour defective subject, at which he just fails to find only the correct test colour, usually results in several test colours appearing to him to match the reference colour for some setting of the reference colour luminance as adjusted by his use of the perforated shutter 19. These other colours show the hue-direction in which he has poorest colour discrimination. If these directions relative to the reference colours are blue-green and red then the subject is a "protran"; if green and red-purple, then the subject is a "deutan," if blue and yellow; then the subject is a "tritan." A "protan" diagnosis is confirmed if to match the red test colours the subject has to raise the relative luminance of the reference colour.

As the test colours cover the complete hue cycle, any defects of colour vision which do not fall into the familiar protan, deutan, and tritan categories can also be diagnosed. Moreover, observers whose colour vision is of the normal pattern but at a uniformly lower or higher level of discrimination than normal can also be detected; in these cases no consistent pattern of additional test colours will be found which match the reference colour, but the setting of the perforated shutter 17 will be abnormally high or low.

By using one lamp 7 to illuminate both the array of colours and to provide the diluting light, the instrument is not very sensitive to changes in lamp intensity, however, maintenance of the colour of the light emitted by the lamp is important and therefore some voltage regulation of the lamp supply may be desirable.

It is to be understood that the above description is by way of example only, and that details for carrying the invention into effect may be varied without departing from the scope of the invention claimed.

We claim:

1. A method of determining the colour discrimination of the vision of a subject comprising:
    viewing simultaneously a source of light of a reference colour of predetermined colour and a plurality of sources of light of different test colours of a variety of predetermined colours, one of which is preferably identical in colour with the colour of the source of light of the reference colour;
    diluting the source of light of reference colour and the plurality of sources of light of different test colours with light of the same colour;
    changing the relative intensity of the diluting light between (a) the source of light of reference colour and (b) the plurality of sources of light of different test colours; and
    indicating the value of said relative dilution, whereby the characteristic of said discrimination can be ascertained by the subject attempting to match the light received from the source of light of reference colour and the light received from one of the plurality of sources of light from the test colours.

2. A method as claimed in claim 1 in which the step of diluting is constituted by diluting the source of light of reference colour and the plurality of sources of light of different test colours with white light.

3. A method as claimed in claim 1 in which the intrinsic intensity of the source of light of reference colour is variable relative to the intrinsic intensity of the source of light of the test colours.

4. A method as claimed in claim 1 in which the viewing step is constituted by transmitting light of selected predetermined colour from a common lamp which generates polychromatic light through a plurality of transparent coloured members to provide said source and said sources.

5. Apparatus for determining the colour discrimination of the vision of a subject comprising a housing, an illuminating lamp in the housing, a first diffusing means for producing a uniform field of diffused light from said lamp in a first plane, a support means mounted for movement in a plane parallel to said first plane, windows in the support means each provided with transparent means of different colours for the passage of diffused light from said first plane, a second diffusing means for producing a uniform field of diffused light from said lamp in a second plane, optical means for varying the relative intensity of diffused light from the two planes, optical means for viewing the light from the two planes superimposed the one upon the other, and indicating means for indicating the relative intensity of the diffused light from the two planes.

6. Apparatus as claimed in claim 5 in which the diffusing means for producing a uniform field of diffused light is a box like channel with open ends with mirrored inner surfaces and a diffusing screen in said plane at the opposite end of the channel to the lamp.

7. Apparatus as claimed in claim 6 in which there are two channels which are positioned parallel to one another and the plane of diffused light of one said channel is co-extensive of the plane of diffused light of the other channel.

8. Apparatus as claimed in claim 5 in which the support means is opaque and is disc like in form and has a plurality of windows therein arranged in a regular pattern, one of which serves as a source of reference colour while the remainder serve as sources of test colours.

9. Apparatus as claimed in claim 7 in which the lamp is mounted at the end of the channel remote from the plane of diffused light and the light from the lamp is directed along each channel by a tilted mirror.

10. Apparatus as claimed in claim 9 in which the optical means for varying the relative intensity of diffused light from the two planes is a plate of varying opacity thereover which is positioned across the openings in the channels adjacent the lamp and movable to change the relative intensity of light passing down the channels.

11. Apparatus as claimed in claim 5 in which the means for viewing the light from the two planes superimposed one one upon the other, are a plane mirror adjacent said first plane and set at an angle thereto, and a plane sheet of transparent material adjacent said second plane and acting as a partial mirror, and set at an angle thereto, the image reflected in the mirror being viewed through the sheet of transparent material.

12. Apparatus as claimed in claim 8 in which there is provided behind the window which serves as a source of reference colour optical means for varying the intensity of light transmitted by said window.

* * * * *